(12) United States Patent
Knox

(10) Patent No.: US 9,004,557 B2
(45) Date of Patent: Apr. 14, 2015

(54) REMOTE RELEASE MECHANISM FOR TOW FITTING

(71) Applicant: Ancra International LLC, Azusa, CA (US)

(72) Inventor: H. Thomas Knox, Independence, KY (US)

(73) Assignee: Ancra International LLC, Azusa, CA (US)

( * ) Notice: Subject to any disclaimer, the term of this patent is extended or adjusted under 35 U.S.C. 154(b) by 0 days.

(21) Appl. No.: 14/156,844

(22) Filed: Jan. 16, 2014

(65) Prior Publication Data
US 2014/0203580 A1 Jul. 24, 2014

Related U.S. Application Data

(60) Provisional application No. 61/755,446, filed on Jan. 22, 2013.

(51) Int. Cl.
| | | |
|---|---|---|
| B66C 1/36 | (2006.01) | |
| F16G 15/00 | (2006.01) | |
| B60D 1/00 | (2006.01) | |
| E05B 67/06 | (2006.01) | |
| B60D 1/60 | (2006.01) | |

(52) U.S. Cl.
CPC ... *B66C 1/36* (2013.01); *B60D 1/00* (2013.01); *E05B 67/06* (2013.01); *B60D 1/60* (2013.01)

(58) Field of Classification Search
USPC .......... 294/83.33, 82.11, 82.34, 82.14, 82.31, 294/82.33, 82.24; 280/504, 515; 24/600.1, 24/600.2, 600.6, 601.5; 59/89, 93
See application file for complete search history.

(56) References Cited

U.S. PATENT DOCUMENTS

| | | | | | |
|---|---|---|---|---|---|
| 1,692,071 | A | * | 11/1928 | Austin et al. | 280/515 |
| 2,845,281 | A | * | 7/1958 | Green et al. | 280/479.3 |
| 3,007,718 | A | * | 11/1961 | Backof | 280/515 |
| 3,911,671 | A | * | 10/1975 | Guillen | 59/89 |
| 4,530,535 | A | * | 7/1985 | Hargreaves | 294/82.33 |
| 4,569,548 | A | * | 2/1986 | Vaders | 294/82.14 |
| 4,590,882 | A | * | 5/1986 | Murphy | 294/82.34 |
| 4,613,180 | A | * | 9/1986 | Pope | 294/82.34 |
| 4,759,674 | A | * | 7/1988 | Schroder et al. | 294/86.41 |
| 5,100,192 | A | * | 3/1992 | McMillan | 294/82.31 |

(Continued)

OTHER PUBLICATIONS

Snap Shackles, Lowy Enterprises, Inc., http://www.lowyusa.com/metal-fasteners/snap-hooks/snap-shackles; Jan. 23, 2013.

(Continued)

*Primary Examiner* — Paul T Chin
(74) *Attorney, Agent, or Firm* — Brinks Gilson & Lione

(57) ABSTRACT

A release fitting for an elongate strap is provided. The release fitting includes a body configured to fixedly engage an end of an elongate strap. An arm is pivotably connected to the body, such that the arm is configured to pivot between a locked position and a release position, a tip portion of the arm comprises a receiving portion. The body comprises a hole disposed therethrough, the hole being coaxially aligned with the receiving portion when the arm is in the locked position. A shaft assembly slidably is disposed within the hole, the shaft assembly biased toward engagement with the receiving portion. A bracket is pivotably mounted to the body and pivotably mounted to the shaft assembly, wherein rotation of the bracket urges linear motion of the shaft assembly within the hole.

16 Claims, 9 Drawing Sheets

(56) References Cited

U.S. PATENT DOCUMENTS

| | | | |
|---|---|---|---|
| 6,237,977 B1 * | 5/2001 | Johnson, Jr. | 294/82.34 |
| 6,539,885 B2 * | 4/2003 | Tylaska | 114/108 |
| 8,539,648 B2 * | 9/2013 | Stiles et al. | 294/82.34 |
| 2003/0062708 A1 | 4/2003 | Gries et al. | |
| 2004/0075240 A1 | 4/2004 | Staggs | |
| 2004/0232655 A1 | 11/2004 | Heitlinger | |
| 2004/0239077 A1 | 12/2004 | Terpsma et al. | |
| 2008/0157507 A1 | 7/2008 | Tayar | |
| 2009/0183533 A1 * | 7/2009 | Stiles | 24/166 |

OTHER PUBLICATIONS

International Search Report and Written Opinion for PCT/US2014/011803, dated Apr. 28, 2014, 9 pages.

* cited by examiner

REMOTE RELEASE MECHANISM FOR TOW FITTING

CROSS-REFERENCE TO RELATED APPLICATIONS

This application claims priority from U.S. Provisional Application No. 61/755,446, filed on Jan. 22, 2013, the entirety of which is hereby fully incorporated by reference herein.

TECHNICAL FIELD

This disclosure is directed to a kit for recovery or towing of a disabled vehicle by a towing vehicle. Often heavy duty recovery straps are used to mechanically attach a disabled vehicle to a movable vehicle. The recovery straps are often associated with a fastener with an arm that allows for receipt of the recovery strap and disengagement from the recovery strap.

BRIEF SUMMARY

A first representative embodiment of the disclosure provides a release fitting for an elongate strap. The release fitting includes a body comprising a first ring that defines a first aperture configured to receive an elongate strap therethrough. The body includes a pivotable connection with an arcuate arm, such that the arm is configured to pivot between a locked position and a release position, wherein a tip portion of the arm comprises a receiving portion. The body comprises a hole disposed therethrough, the hole being coaxially aligned with the receiving portion when the art is in the locked position, and a shaft assembly is slidably disposed within the hole, the shaft assembly biased toward engagement between an extended first end portion of the shaft and the receiving portion. A bracket is pivotably mounted to the body and fixed to the shaft assembly, wherein rotation of the bracket urges linear motion of the shaft assembly within the hole.

A second representative embodiment of the disclosure provides a release fitting for an elongate strap. The fitting includes a body configured to fixedly engage an end of an elongate strap and an arm pivotably connected to the body. The arm is configured to pivot between a locked position and a release position. A tip portion of the arm comprises a receiving portion. The body comprises a hole disposed therethrough, the hole being coaxially aligned with the receiving portion when the arm is in the locked position. A shaft assembly is slidably disposed within the hole, the shaft assembly biased toward engagement with the receiving portion. An electro-mechanical device that is operatively engaged with the shaft assembly, such that operation of the electro-mechanical device urges linear motion of the shaft assembly within the hole.

Other embodiments of the disclosure will become apparent in view of the following description taken in connection with the accompanying drawings.

DETAILED DESCRIPTION OF THE DRAWINGS AND THE PRESENTLY PREFERRED EMBODIMENTS

Figure 1:
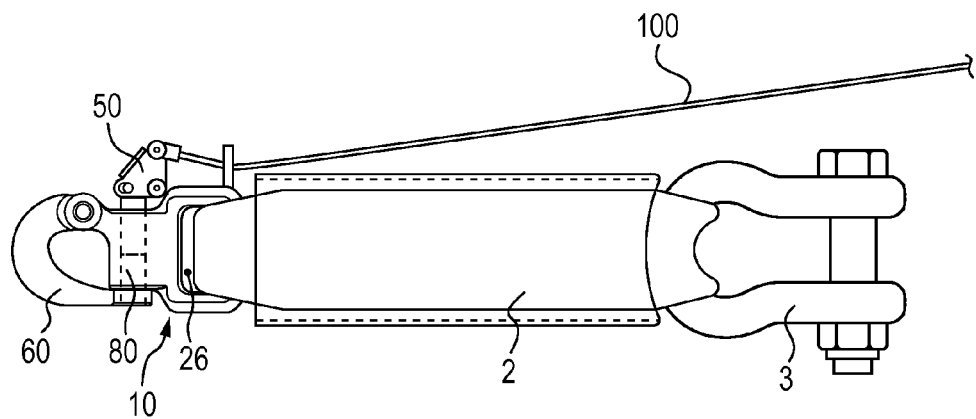
FIG. 1 is a front view of a release fitting connecting with a conventional connector strap and a conventional shackle.
Figure 1A:
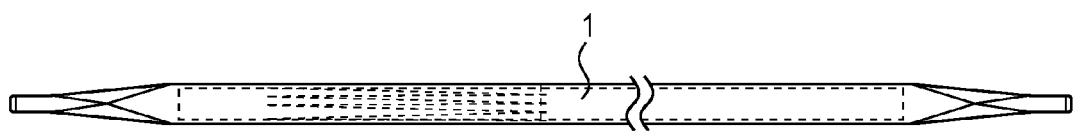
FIG. 1a is a front view of an elongate recovery strap.
Figure 2:
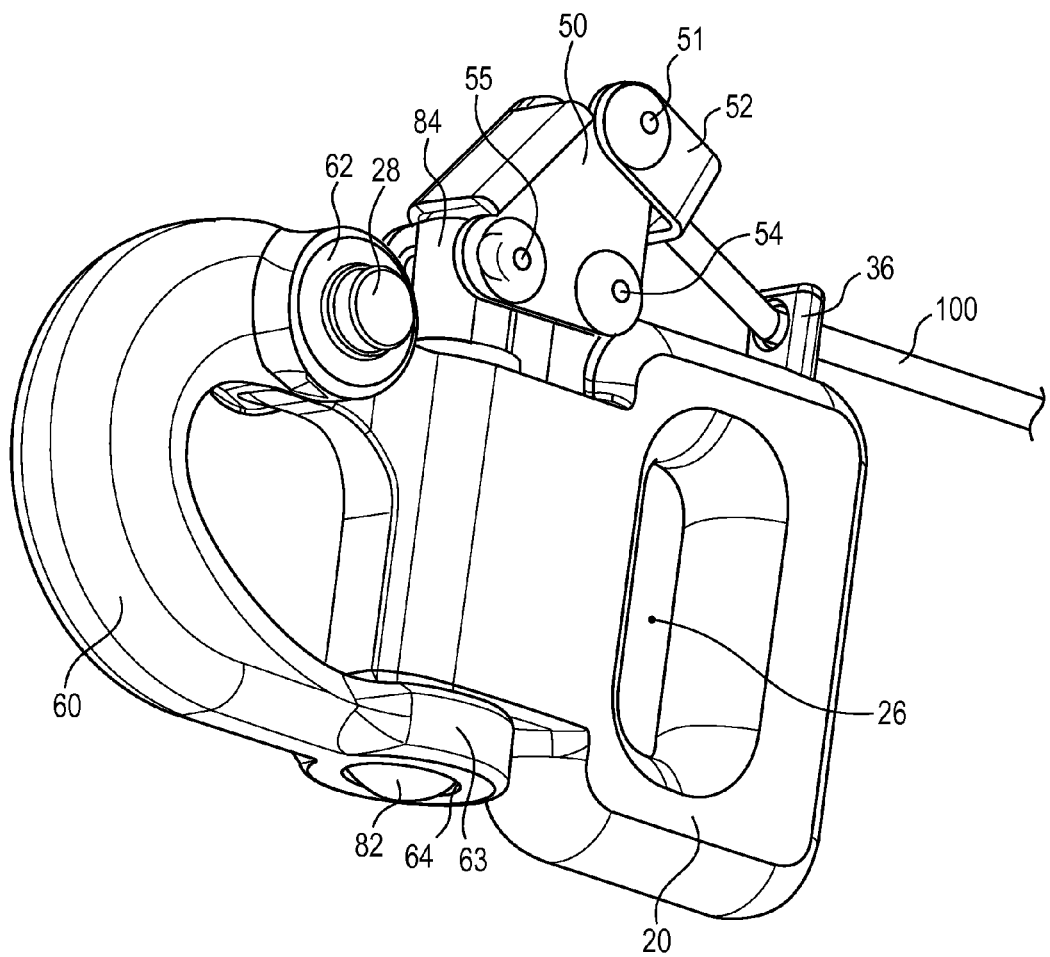
FIG. 2 is a perspective view of the release fitting of FIG. 1, showing the arm in a locking position.
Figure 3:
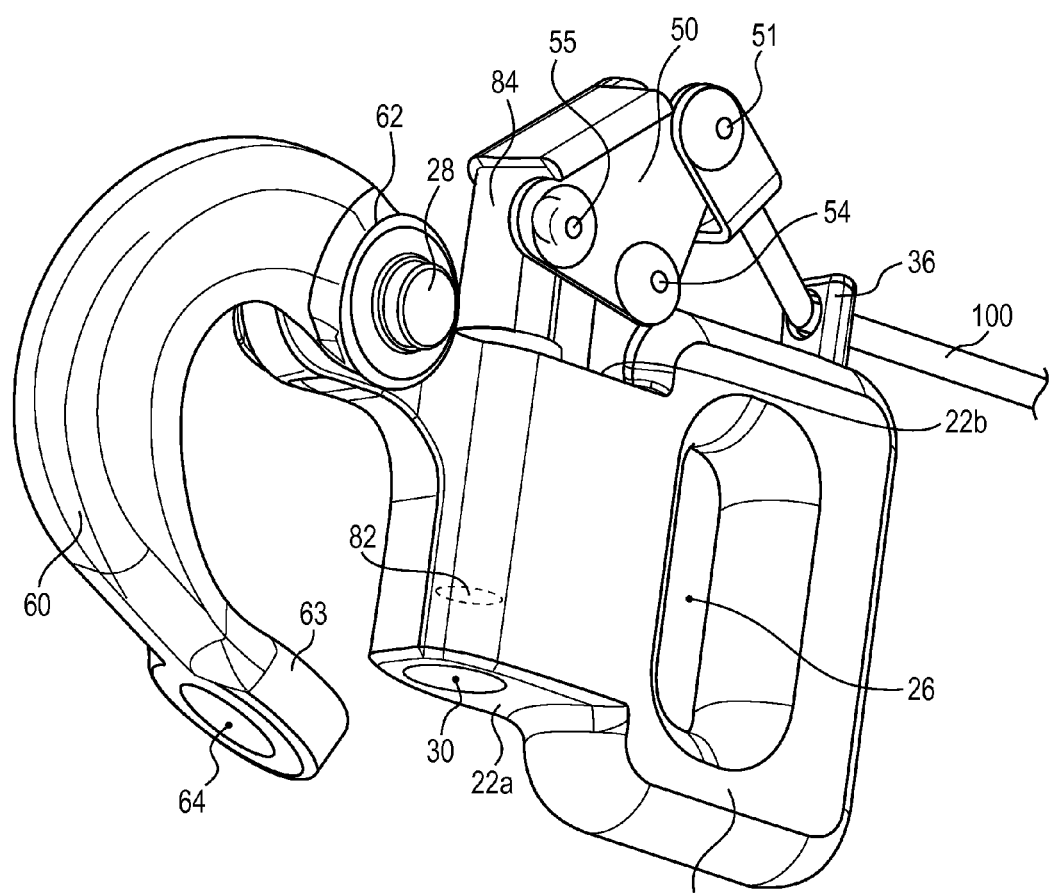
FIG. 3 is the view of FIG. 2 showing the arm in a release position.
Figure 4:
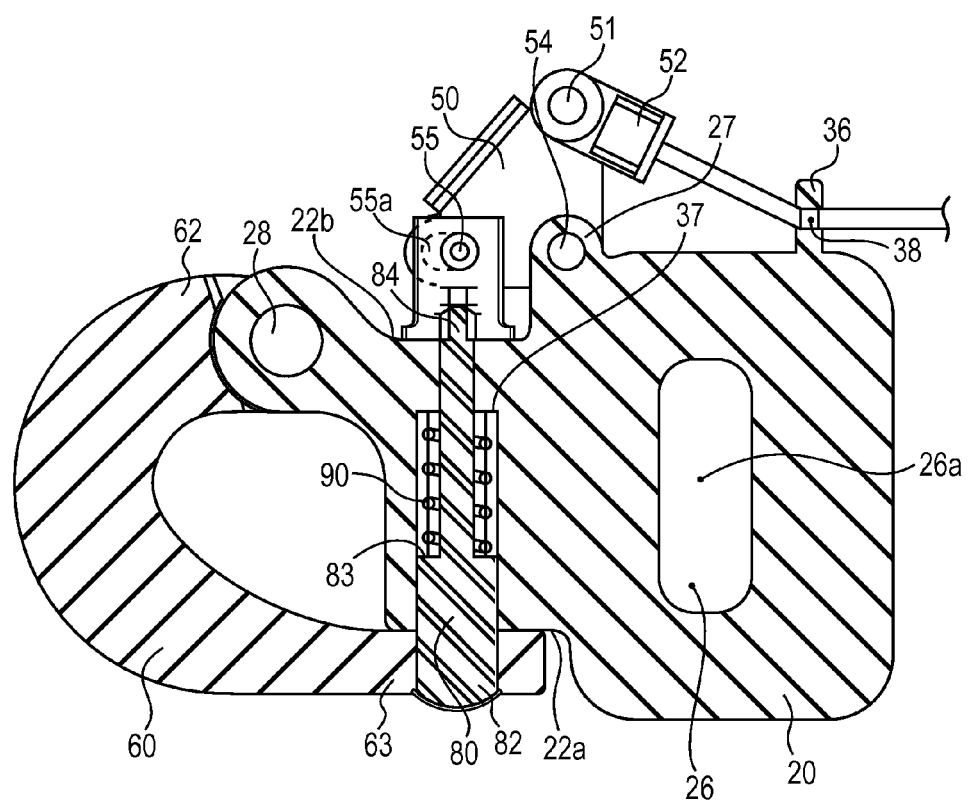
FIG. 4 is a sectional view of the release fitting of FIG. 1, showing the arm in the locking position.
Figure 5:
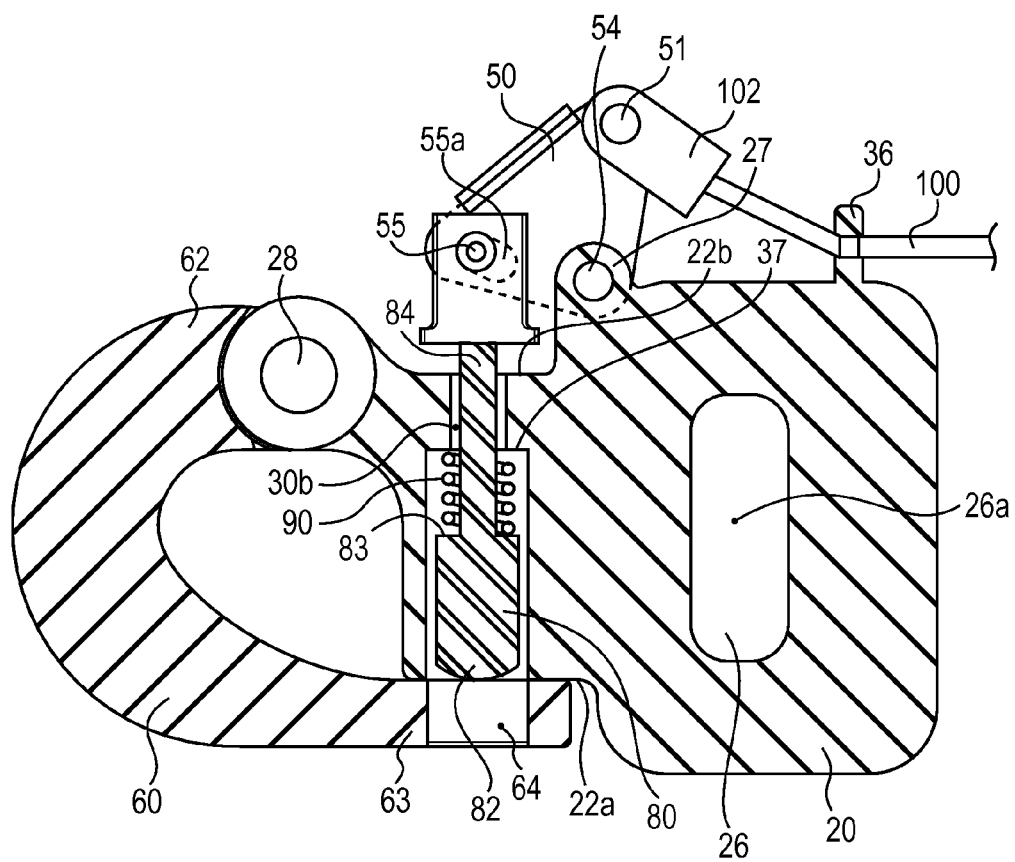
FIG. 5 is the view of FIG. 4 showing the arm in the locking position with a pin disposed through the arm withdrawn from the arm.

Turning now to FIGS. 1-5, a release fitting 10 configured for remote release of an elongate strap 1 is provided. The release fitting 10 is configured for use with a conventional strap 1 that may be implemented as a tow strap between a towing vehicle and a vehicle to be towed. As shown in FIG. 1, the release fitting 10 may receive a connector strap 2 through an aperture 26, with an opposite side of the connector strap 2 engaged with a conventional shackle 3 that is connected to a towing vehicle (not shown). As discussed in greater detail below, a first end of a recovery strap 1 (FIG. 1a) may be received by an arm 60 pivotably mounted to the release fitting 10 when the arm 60 is retained in a locked position (FIG. 2) and the first end of the recovery strap 1 (when in tension) would pull free of the arm 60, and the release fitting 10 when the arm 60 pivots to the release position (FIG. 3). The arm 60 is retained in the locking position due to engagement with a pin 80 slidably mounted with the release fitting 10.

The release fitting 10 includes a rigid body 20, such as stamped or molded piece from steel. The body 20 may be a monolithic piece that defines an aperture 26 that extends through the thickness of the body 20, which is configured to receive one end of a connector strap 2 therethrough. Alternatively, the body 20 may be formed from multiple components that are fixed together to define the aperture 26. The body 20 includes a hole 30. In some embodiments, the hole 30 extends along an axis that is perpendicular to an axis, or line through the aperture 26. The hole 30 may extend between a bottom surface 22a and an upper surface 22b of the body 20, with the hole 30 including a decreased diameter portion 30b that prevents the pin 80 inserted therein from sliding through the upper surface 22b of the body 20.

The body may further include a flange 36 that extends therefrom which includes a positioning feature 38 that directs a pull cord 100 therethrough. The body 20 pivotably supports an arm 60 through a pinned connection 28, or other connection that allows the arm 60 to one rotational degree of freedom with respect to the body 20. In some embodiments, the pinned connection 28 may extend in parallel to an axis 26a through the aperture 26 that receives an end of the connector strap 2. In other embodiments, the pinned connection 28 may extend at another orientation with respect to the body 20, or features within the body.

In some embodiments, the arm 60 is an arcuate member that extends between a first end 62 that is connected to the body 20 (with a pinned or other connection 28) and a second end 63 that includes a receiving aperture 64. The arm 60 is rotatable (about the pinned connection 28) between a release position (FIG. 3) where the second end 63 of the arm 60 is spaced from the bottom surface 22a of the body 20 and a locked position (FIG. 2) where the second end 63 of the arm 60 contacts the bottom surface 22a of the body 20. In some embodiments, the arm 60 in the locking position is positioned such that the receiving aperture 64 receives a bottom end portion 82 of the pin 80. The insertion of the pin 80 through the alignment aperture 64 prevents the arm 60 from rotating out of the locking position either due to gravity or due to tension placed upon the arm 60 by the tension in the recovery strap 1 when disposed thereon.

The pin 80 may be an elongate rigid member that extends between a bottom end portion 82 and a top end portion 84, which normally extends out of the hole 30 through the upper surface 22b of the body 20. The pin 80 may be formed with a diameter that is just smaller than the diameter of the hole 30 in the body 20 at the bottom end portion 82, with the top end portion 84 formed coaxially with the bottom end portion 82 and at a smaller diameter, which, in some embodiments is just smaller than the hole 30 through the upper surface 22b of the body 20. The transition between the bottom end portion 82 and the top end portion 84 may include a bearing surface 83. A spring 90, such as a compression spring or other biasing member, may be disposed between the bearing surface 83 and a transition wall 37 such that the compression spring 90 urges the pin downwardly within the hole 30, such that the bottom end portion 82 extends through the receiving aperture 64 when the arm 60 is in the locking position.

The body 20 may additionally pivotably receive a bar or bracket 50 with a pinned connection 54. In some embodiments, the bar 50 is additionally pivotably connected to the top end portion 84 of the pin 80, and additionally connected to an end of a pull wire 100. The bar 50 is configured such that when the pull wire 100 is pulled in tension (normally by a user that is in or proximate to the towing vehicle) the bar 50 is urged to pivot with respect to the body 20 upon the pinned connection 54. As can be appreciated with reference to FIGS. 2-5, the pivoting of the bar 50 causes connection 55 between the pin 80 and the bar 50 to raise with respect to the upper surface 22b of the body 20, which pulls the pin 80 upwardly within the hole 30, and pulls the bottom end portion 82 of the pin out of the receiving aperture 64 in the arm 60. In use, when there is tension on the recovery strap 1 that is connected to the arm 60, the arm 60 is pulled from the locking position to the release position, which allows the recovery strap 1 to slip off of the arm 60. In embodiments where the device 10 is used in conjunction with a connection between a towed vehicle and a towing vehicle, the movement of the arm 60 from the locking position to the release position disconnects the towed vehicle from the towing vehicle.

In some embodiments, the pivot connection 55 between the upper end portion 84 of the pin and the bar 50 may be through a longitudinal slot 55a (FIGS. 4 and 5) which allows for the pinned connection 55 to slide with respect to the bar 50 because the pin 80 is constrained for only longitudinal motion within the hole 30. In some embodiments, the upper end portion 84 of the pin 80 may receive a fastener, such as a nut, thereon, which in some embodiments may be threadingly fixed thereto. The nut may be provided to prevent the pin 80 from falling out of the hole 30 through the bottom surface 22a of the body 20 as urged by the spring 90. The nut further may include an aperture that receives the pin 55 that is also pivotably received by the bar 50 (an in some embodiments through the slot 55a in the bar 50).

A first end of the pull wire 100 may be pivotably fixed to the bar 50 at a pinned connection 51. The pinned connection 51 may be directly connected to an end of the pull wire 100, or may be with a bracket 102 or other suitable structure. In some embodiments, the body 20 may include a first finger that extends therefrom. The flange 36 includes a hole, cutout, recess, or other suitable structure to align the pull wire 100 with respect to the body 20 such that the pull wire 100 approaches the bar 50 at a consistent angle, regardless of the direction that the pull wire 100 extends from the body 20, which allows the bar 50 to pivot consistently with respect to the body 20 and the pin 30 when the pull wire 100 is placed in tension.

Figure 6:
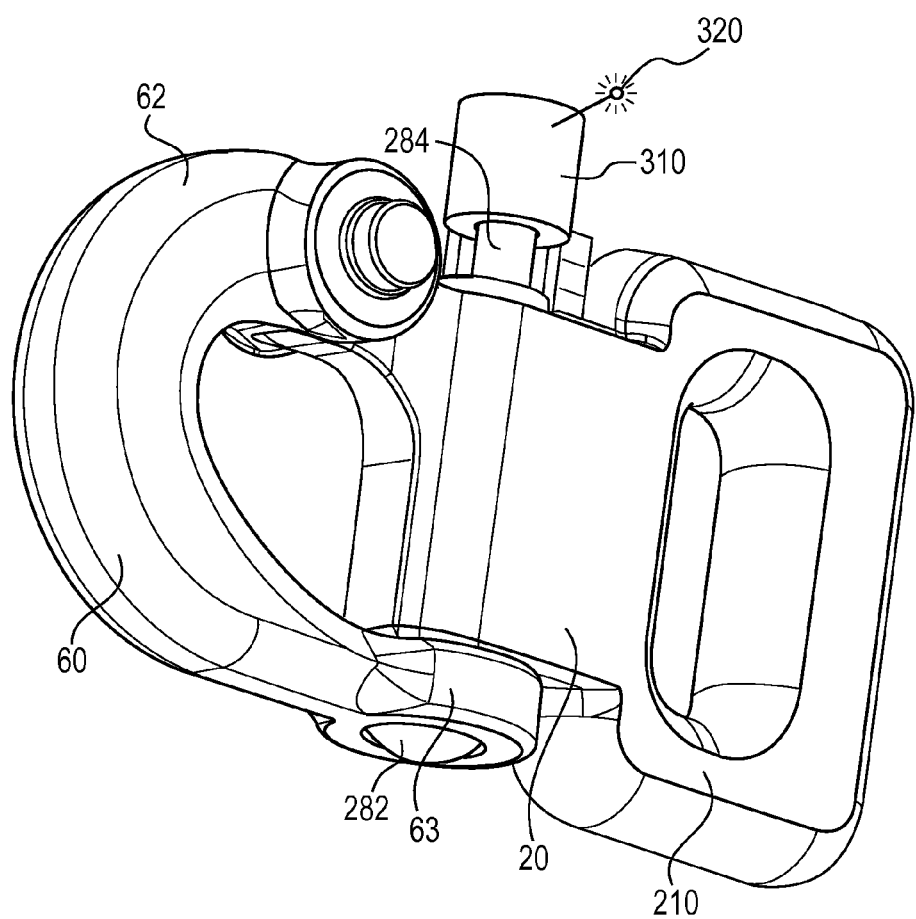
FIG. 6 is a perspective view of another release fitting, showing the arm in a locking position.
Figure 6A:
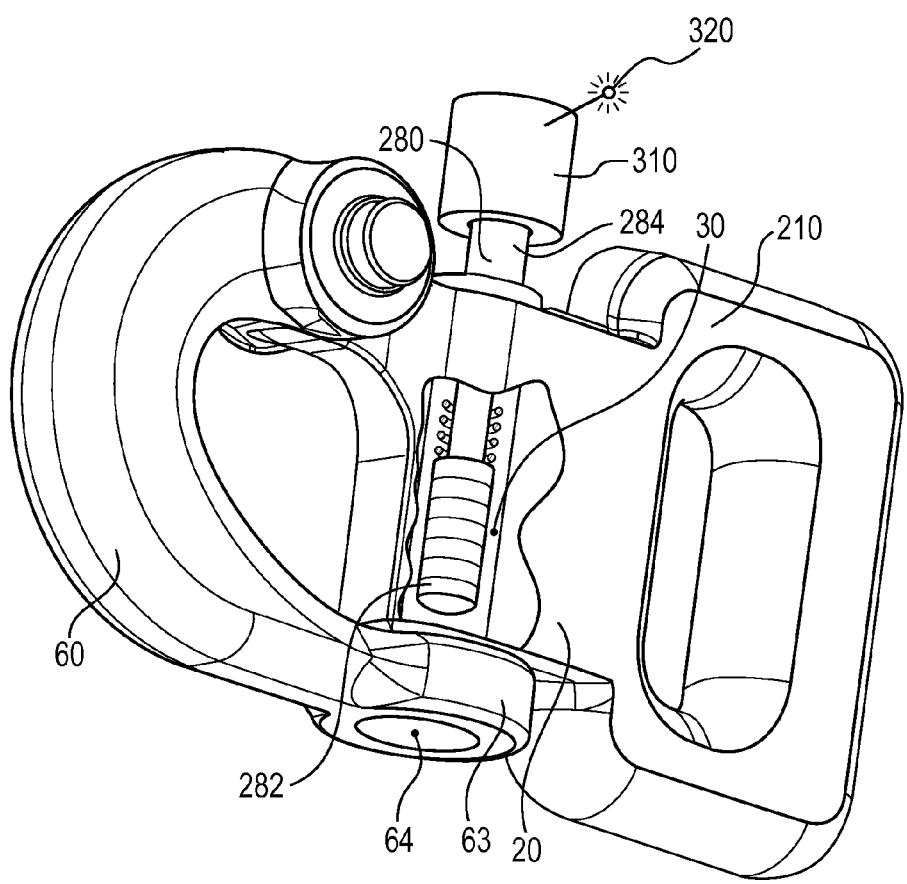
FIG. 6a is the view of FIG. 6, showing a partial internal view of the hole and the pin, with the pin withdrawn from the arm.

Turning now to FIGS. 6-6a, another release fitting 210 is provided. The release fitting includes a body 20 and arm 60 similar to the release fitting 10 discussed above. The body 20 of the release fitting 210 includes a hole 30, like the hole 30 discussed above, which receives a pin 280. Similar to the pin 80, the pin 280 includes a bottom portion 282 that is biased within the hole 30 toward engagement with a receiving aperture 64 in the arm 60 to retain the arm 60 in the locking position.

In contrast to the device 10, the device 210 includes a remotely operable electro-mechanical device that is configured to selectively urge translation of the pin 280 upwardly (against the biasing force of the spring 90) such that the bottom portion 282 of the pin 280 no longer engages the receiving aperture 64 (FIG. 6a). In some embodiments, the body 20 may directly support a solenoid, linear actuator, stepper motor or other similar electro-mechanical device 310 (which receives electrical current and upon receipt or removal of electrical current causes a shaft associated therewith to linearly translate with respect to the body of the device 310) that, when energized (or deenergized depending upon the relative position of the electro-mechanical device 310 and the pin 280) causes the pin 280 to move upwardly within the hole 30. In some embodiments, the electro-mechanical device 310 may be directly mounted to the body 20 and may be directly connected to the pin 280 to cause linear motion of the pin 280. When the electro-mechanical device 310 is deenergized (energized) the device returns to its normal position and the pin 280 is urged to its normal position (due to the downward biasing force of the spring 90) to cause engagement between the bottom end portion 282 and the arm 60, when in the locking position (FIG. 6).

Figure 7:
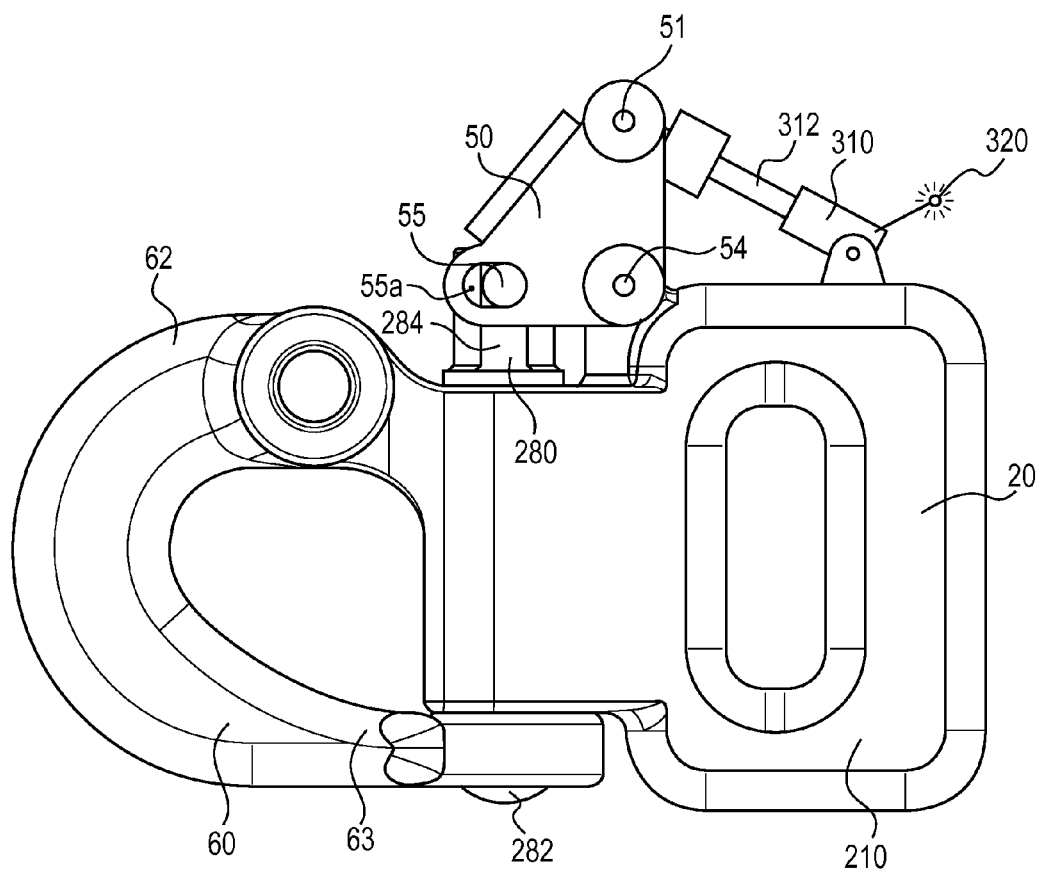
FIG. 7 is a perspective view of yet another release fitting, showing the arm in a locking position.
Figure 7A:
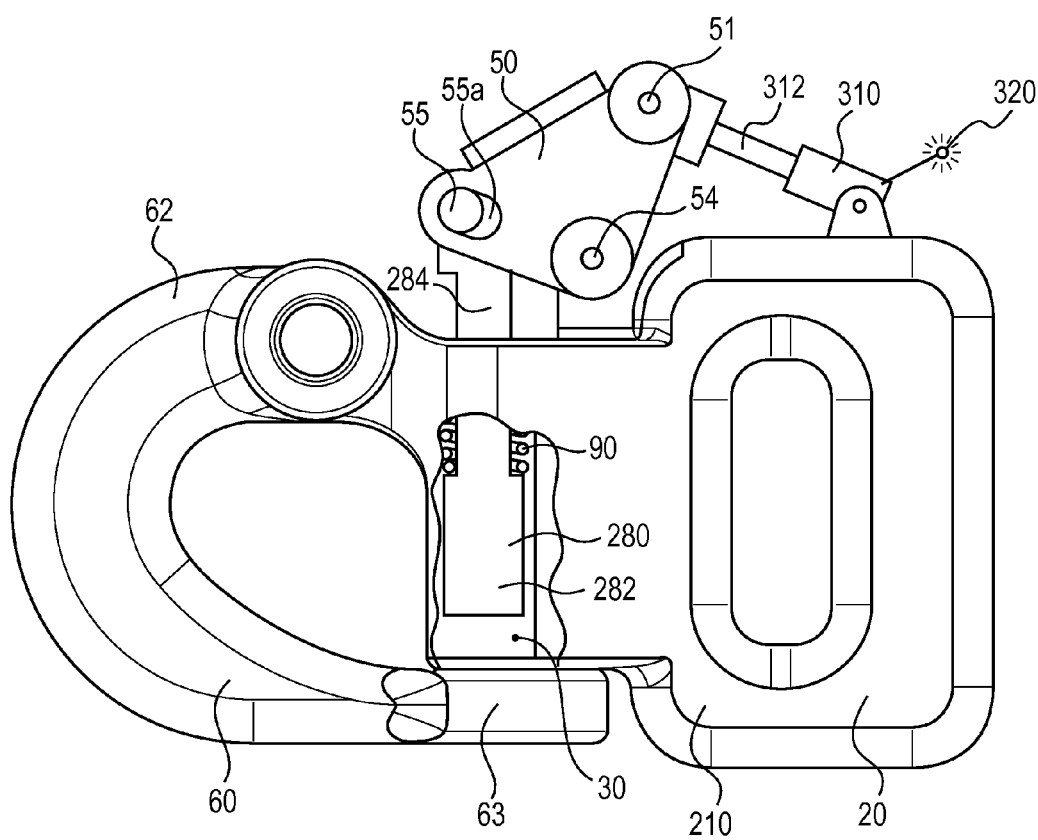
FIG. 7a is the view of FIG. 7, with the pin withdrawn from the arm.

In other embodiments, shown in FIGS. 7-7a, the body 210 may pivotably support a bar or bracket 50 (similar to the bar or bracket 50 discussed above) that pivotably is connected to a top end 284 of the pin 280, such that rotation of the bar 50 about the body 20 causes linear motion of the pin 280 within the hole 30 against the spring force. In these embodiments, the electro-mechanical device 310 may be connected to the bar 50 with a shaft 312, such that the bar 50 is urged to rotate about the body 20 when the device 310 is energized (deenergized), or is switched to a first state, which translates the pin 280 away from interaction with the arm 60 (FIG. 7a), to allow the arm 60 to rotate to the release position (when the recover strap 1 attached thereto is in tension). The electro-mechanical device 310 is configured such that when deenergized (energized), or is switched to a second state, the shaft thereof returns to the normal position, which allows the bar 50 to rotate back to the normal position, as urged by the biasing force of the spring 90 that urges the pin 280 to the normal position with the bottom end portion 282 thereof configured to extend through the receiving aperture 64 in the arm 60 (FIG. 7).

In both of these embodiments, the electro-mechanical device 310 may be configured to operate based upon a direct control by the user, such as through a controller that is hard wired to the electro-mechanical device 310. Alternatively, the electro-mechanical device 310 (or a controller that is connected to the electro-mechanical device 310) may be configured to receive a remote signal through an antenna 320 from a source of instruction, such as through a wireless, cellular, GPS, Bluetooth, or another wireless communication system known in the art. Embodiments where the electro-mechanical device 310 (such as a solenoid, a linear actuator, stepper motor, or the like) receives an input and ultimately urges motion of the pin 280 through the hole 30 in the body 20 may be preferable to embodiments that allow for remote release of the arm 60 with a mechanical connection (such as a pull cable 100) because they allow for remote operation release of the arm 60 from the locking position, which allows for rapid disengagement of the recovery strap 1 (and whatever vehicle, cargo container, or other structure is connected to the arm 60 of the body 20) from a remote location, i.e. a position not upon the towing vehicle that is mechanically connected to the body 20.

While the preferred embodiments have been described and illustrated in detail, it is to be understood that this is intended by way of illustration and example only, the scope of the invention being limited by the terms of the following claims.

The invention claimed is:

1. A release fitting for an elongate strap, comprising:
   a body configured to fixedly engage an end of an elongate strap;
   an arm pivotably connected to the body, such that the arm is configured to pivot between a locked position and a release position, a tip portion of the arm comprises a receiving portion;
   the body comprises a hole disposed therethrough, the hole being coaxially aligned with the receiving portion when the arm is in the locked position;
   a shaft assembly slidably disposed within the hole, the shaft assembly biased toward engagement with the receiving portion;
   a bracket pivotably mounted to the body and pivotably mounted to the shaft assembly, wherein rotation of the bracket urges linear motion of the shaft assembly within the hole; and
   an elongate cable affixed to the bracket, wherein tension within the elongate cable urges pivoting of the bracket and translation of the shaft assembly through the hole;
   wherein the body further comprises a flange extending from the body wherein the elongate cable is threaded through the flange.

2. The release fitting of claim 1, wherein the hole comprises a bearing surface and the shaft assembly comprises a second bearing surface with a biasing member disposed therebetween.

3. The release fitting of claim 1, wherein the shaft assembly further comprises a threaded portion at the second end thereof, the threaded portion receives a fastener disposed thereon.

4. The release fitting of claim 3, wherein the fastener is pivotably connected with the bracket.

5. The release fitting of claim 1, wherein the bracket comprises a longitudinal slot that receives a pin that is engaged with a second end of the shaft assembly.

6. The release fitting of claim 1, wherein the arcuate arm is configured to engage a second strap when the arcuate arm is in the locking position.

7. The release fitting of claim 1, further comprising an electro-mechanical device mounted upon the body and operatively engaged with the elongate cable, wherein operation of the electro-mechanical device urges linear motion of the elongate cable.

8. The release fitting of claim 7, wherein the electro-mechanical device is a solenoid operated shaft.

9. The release fitting of claim 7, wherein the electro-mechanical device is configured to communicate remotely with a controller, wherein the controller provides a signal to the electro-mechanical device to urge rotation of the bracket.

10. The release fitting of claim 9, wherein the electro-mechanical device is configured to communicate wirelessly with a controller.

11. A release fitting for an elongate strap, comprising:
    a body configured to fixedly engage an end of an elongate strap;
    an arm pivotably connected to the body, such that the arm is configured to pivot between a locked position and a release position, a tip portion of the arm comprises a receiving portion;
    the body comprises a hole disposed therethrough, the hole being coaxially aligned with the receiving portion when the arm is in the locked position;
    a shaft assembly slidably disposed within the hole, the shaft assembly biased toward engagement with the receiving portion;
    a bracket pivotably mounted to the body and pivotably mounted to the shaft assembly, wherein rotation of the bracket urges linear motion of the shaft assembly within the hole; and
    an elongate cable affixed to the bracket, wherein tension within the elongate cable urges pivoting of the bracket and translation of the shaft assembly through the hole;
    wherein the body further comprises a flange extending from the body wherein the elongate cable is threaded through the flange; and
    an electro-mechanical device that is operatively engaged with the elongate cable, such that operation of the electro-mechanical device urges linear motion of the elongate cable.

12. The release fitting of claim 11, wherein the electro-mechanical device is a solenoid.

13. The release fitting of claim 11, wherein the electro-mechanical device urges motion of the shaft assembly within the hole in a first direction against the biasing force of a spring disposed within the hole when the electro-mechanical device is in a first state, and the electro-mechanical device allows motion of the shaft assembly in a second opposite direction when the electro-mechanical device is in the opposite second state.

14. The release fitting of claim 13, wherein the electro-mechanical device is energized when in the first state.

15. The release fitting of claim 11, wherein electro-mechanical device communicates with a remote input device, which changes a state of the electro-mechanical device from between opposite first and second states.

16. The release fitting of claim 15, wherein the electro-mechanical device wirelessly communicates with the remote input device.

* * * * *

UNITED STATES PATENT AND TRADEMARK OFFICE
CERTIFICATE OF CORRECTION

| | | |
|---|---|---|
| PATENT NO. | : 9,004,557 B2 | Page 1 of 1 |
| APPLICATION NO. | : 14/156844 | |
| DATED | : April 14, 2015 | |
| INVENTOR(S) | : H. Thomas Knox | |

It is certified that error appears in the above-identified patent and that said Letters Patent is hereby corrected as shown below:

In the Claims

Column 6, claim 15, line 54, after "claim 11, wherein" insert --the--.

Signed and Sealed this
Fifteenth Day of September, 2015

Michelle K. Lee
*Director of the United States Patent and Trademark Office*